Figure 1:
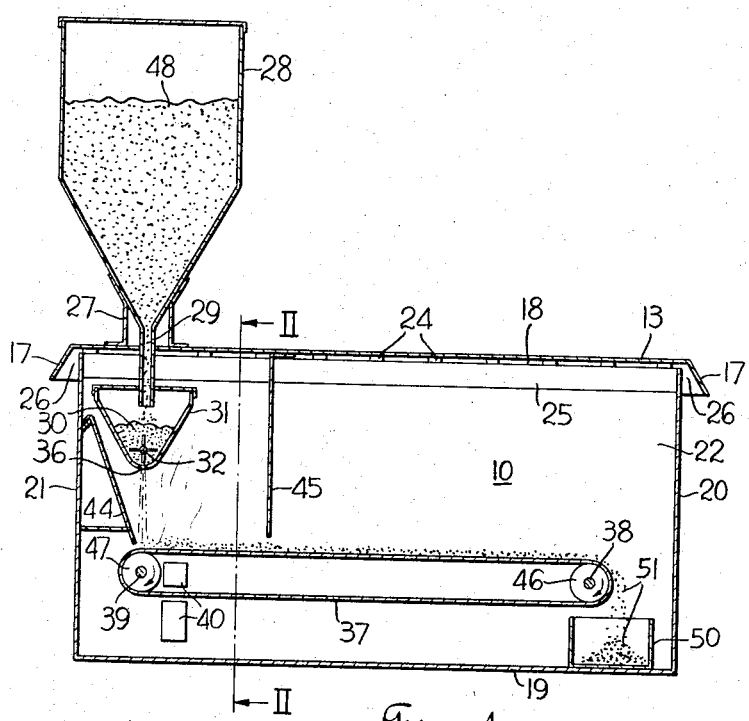

April 9, 1968   J. E. SCHROEDER   3,377,160
PROCESS OF MAKING A HIGH SURFACE AREA SILVER CATALYST
Filed Dec. 31, 1964

Inventor
James E. Schroeder
By Edmunde D. Riedl
Attorney

3,377,160
PROCESS OF MAKING A HIGH SURFACE AREA SILVER CATALYST

James Earl Schroeder, Greendale, Wis., assignor to Allis-Chalmers Manufacturing Company, Milwaukee, Wis.
Filed Dec. 31, 1964, Ser. No. 422,794
5 Claims. (Cl. 75—118)

This invention broadly relates to electrochemical cells, and especially to those electrochemical cells known as fuel cells. More particularly, this invention relates to new and useful electrode structures for use in fuel cells and like apparatus. In particular, this invention deals with improved silver electrodes and an improved silver catalyst for such electrodes.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of my invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

The electrode of my invention is particularly suitable in those fuel cells having oxygen or air oxidant supplied to the electrode surface remote from the electrolyte. The oxidant diffuses through the porous electrode until it meets the electrolyte at a three phase boundary of electrode, oxidant, and electrolyte.

In order for the oxygen to react, at this boundary it must first become activated. Activation of the oxygen is especially important because it is believed that the rate of activation of oxygen at the cathode is the rate limiting reaction in a fuel cell. Activation has been achieved by heat, pressure, and for low temperature reaction by catalysts. Silver, as an oxygen activation catalyst, has been known and heretofore used. The amount of the catalyst's surface area exposed to the fuel cell reactants, however, in part limits the reaction rate. If the surface area of the silver is increased, some increase in reaction rate results.

I have discovered that silver particles of increased surface area, hence improved catalytic activity are produced from reduction of silver by the rapid and explosive decomposition of silver carboxylates, especially silver formate and silver oxalate. My method, as hereinafter described yields a high surface area silver that when fabricated into a fuel cell electrode gives extraordinarily high outputs. Of course, the silver electrode produced from the silver made by my process is suitable for activating any reactant that previously known silver catalysts have been used to activate.

Accordingly, the general object of my invention is to produce a high surface area silver suitable for fabrication into electrodes of the type used in fuel cells.

A further object of my invention is to provide a method of producing fuel cell catalysts from the decomposition of silver carboxylates.

Figure 2:
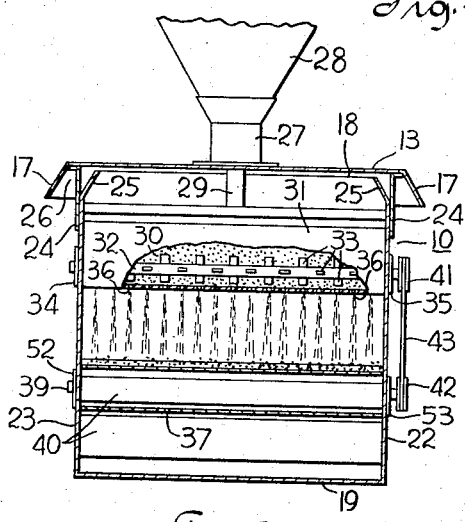

Still other objects and advantages of my invention will become apparent upon a further reading of this specification and claims together with reference to the accompanying drawing in which:

FIG. 1 is a longitudinal cross sectional view of an apparatus suitable for accomplishing the explosive decomposition of silver carboxylates required for producing a fuel cell grade silver catalyst; and FIG. 2 is a cross sectional view through line II—II of FIG. 1.

Silver formate, and silver oxalate are to be preferred over other organic silver salts in practicing my invention because these preferred salts contain sufficient oxygen in the molecule to oxidize all the carbon present to carbon dioxide. Furthermore, they decompose cleanly without the formation of solid by-products. Silver oxalate is preferred over silver formate because it gives only silver and carbon dioxide as products as set forth in the following equation:

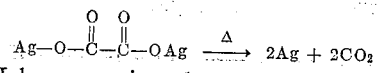

Since I have experienced my best results with silver oxalate, I shall now describe the best mode of practicing my invention using silver oxalate as illustrative of decomposible silver carboxylates.

In the practice of my invention the silver carboxylate is first obtained in a fine crystalline form. In an aqueous medium this can be done by reacting silver ion with oxalate ion as follows:

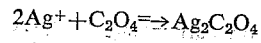

I find this reaction is best carried out by admixing silver nitrate with water and oxalic acid or some other water soluble oxalate. Although both the silver nitrate and the oxalate may be added in the solid state to the aqueous medium, prior dissolution of at least one of the crystalline substances is desirable. Thus I prefer to first dissolve the oxalate in water, using sufficient oxalate to form a saturated solution. Then crystalline silver nitrate is added to this saturated oxalate solution with some stirring. A reaction immediately ensues resulting in the silver oxalate precipitating as a shower of very fine particles.

This precipitate is allowed to settle and afterwards the excess mother liquor is decanted from the precipitate. Now the silver oxalate is separated from the remaining mother liquor by filtration or other suitable separation means, washing several times with water during the separation.

The collected silver oxalate crystals are then dried. Apparently the drying step is material to the performance of the later described decomposition step. To achieve good drying, the crystals should be spread in a thin layer upon flat surface of a container that is a good heat conductor such as aluminum, rather than upon a glass surface, for example. The drying is desirably accelerated with some heat and I find the best source of heat to be infra-red lamps. The crystals dry into a friable conglomerate mass. Proper drying of the silver oxalate crystals is indicated by the formation of flakes that separate from the surface.

The next step is to size the dried crystals. Proper sizing is important. In the later decomposition step, heat is transferred from a heated surface to the sized particles of silver carboxylate. The temperature of the heated surface is selected with reference to the particle size so that when heat is transferred to the individual particles, they uniformly and rapidly reach the decomposition temperature.

The sizing of the silver oxalate crystals is performed by breaking the hard and brittle crystal conglomerate until all the particles pass through a 10 Tyler mesh screen. These particles, now all smaller than 10 mesh, are shaken onto a 35 Tyler mesh screen. Those particles that are retained on the screen are suitable for decomposition to a catalytic silver. Thus the particle size that I find particularly desirable for practicing my invention is between 10 and 35 Tyler.

The rejected particles smaller than 35 mesh can be decomposed separately, collecting the silver, and dissolving it in nitric acid. Silver nitrate is crystallized from the nitric acid and conserved for use in a subsequent precipitation of silver carboxylate.

The next step in the production of my silver catalyst is to reduce the sized silver oxalate crystals to metallic silver. This decomposition procedure will be best understood with reference to the drawing. In the apparatus shown, housing 10 comprises an enclosure having endwalls 20, 21, sidewalls 22, 23, and bottom 19. A cover 13 is supported above the upper edge 18 of the housing walls 20, 21, 22, 23 by a plurality of struts 24 anchored to the sidewalls 22, 23 at suitable structural locations.

Cover 13 has outwardly turned flaps 17 extending downwardly to overlap a portion of housing walls 20, 21, 22, 23. Sidewalls 22, 23 have inwardly turned flaps 25 that cooperate with flaps 17 on cover 13 to provide a vent 26 that serves as an exit for gases produced during operation.

Mounted by support means 27 upon cover 13 is hopper 28 for storing silver carboxylate crystals 48 prior to decomposition. From hopper 28 leads spout 29 extending downward through cover 13. A covered trough 31 is disposed below spout 29 to receive and temporarily hold the silver carboxylate supplied from hopper 28 through spout 29.

Trough 31 extends laterally across housing 10 and is supported by attachment to sidewalls 22, 23. Along the bottom of trough 31 is a series of outlet holes 36 for delivery of the silver carboxylate 30 from trough 31 onto a heated surface for decomposition.

A shaft 32, rotatably supported by bearing means 34, 35 extends through the lower portion of trough 31. A plurality of transversely protruding prongs 33 are mounted on shaft 32 for agitation of silver carboxylate and aid its dispersion through holes 36.

Mounted in sidewalls 22, 23 below shaft 32 are shafts 38, 39 that are rotatably supported respectively in bearing means of which only means 52, 53 for shaft 39 are shown in FIG. 2. About shafts 38, 39 are roller 46, 47 that support a conveyer belt 37 made of stainless steel mesh or other good heat conductor.

At an end of shaft 32 and shaft 39 are attachment means 41, 42 respectively for attaching a drive means 43 to transmit power from a source not shown to rotate shafts 32, 38, and 39 in the direction indicated by the arrows on the rollers 46, 47.

A heating means 40 is located upstream from the point at which silver carboxylate contacts conveyer belt 37. Means 40 heats belt 37 to the desired temperature during operation.

Because the reaction within housing 10 can become violent, batter boards 44, 45 are mounted within housing 10 to direct erupting unreacted silver carboxylate back onto heated belt 37.

During operation, belt 37 is heated by means 40 to a temperature about 35° C. greater than the decomposition temperature of the silver carboxylate. The temperature however cannot exceed 375°, because the silver particles above this temperature will undergo some sintering which is undesirable because sintering decreases surface area. For example, when decomposing silver oxalate, the silver oxalate particles preferably contact a surface of 175–375° C.

As power driven shafts 32, 39 rotate, the prongs 33 agitate the silver carboxylate in trough 31 so it falls through holes 36 onto the moving heated belt 37. The silver carboxylate almost immediately decomposes as it contacts the heated belt 37. The by-product gases exit through vent 26 and the silver 51 falling back onto belt 37 is carried beyond the reaction zone for collection in container 50.

The silver 52 collected in container 50 can now be fabricated into a fuel cell electrode by any suitable process. In order to illustrate the output characteristics of my electrode, however, I shall now describe one method of making a fuel cell cathode from silver produced by my process, together with the outputs attained by a fuel cell operating with that cathode.

The silver powder was mixed into water containing a wetting agent, for example, an alkylaryl polyether alcohol, in the ratio of 1 gram of silver powder to 4 ml. of 4:1 wetting agent to water solution. The excess liquid was pulled off in a suction funnel and the damp silver transferred into an aqueous dispersion of polytetrafluoroethylene in the ratio of 1 gram silver (dry basis) to 2 ml. of 5:1 aqueous polytetrafluoroethylene dispersion. (5 parts of water by weight to 1 part by weight of 1.1 specific gravity commercial aqueous polytetrafluoroethylene dispersion.

The excess liquid was again pulled off in a suction funnel, and the silver dried in an oven at 160° C. for about 1 hour.

The oven dried silver-polytetrafluoroethylene powder was poured into a jig (0.7 g./in.$^2$) and struck off level. A nickel support screen was placed on top of the leveled powder. The silver-polytetrafluoroethylene powder and screen were subjected to sufficient pressure to form a cohesive plaque. The plaque was then heated in an oven to about 355° C. for about 20 minutes.

The electrode was installed as the cathode in a hydrogen-oxygen fuel cell having a 20:20 platinum-palladium anode. In the cell, the electrolyte was 35–38% aqueous potassium hydroxide; the cell operating temperature was 92° C.; and the reactant gases were supplied at a pressure of 25 p.s.i.g. The cell was subjected to a life test and the fall off in voltage was only 1.2% after 900 hours of operation. The following table describes the voltage amperage characteristics of the cell at 812 hours of operation:

| ASF: | Volts |
| --- | --- |
| 0 | 1.06 |
| 20 | 1.01 |
| 40 | 0.973 |
| 60 | 0.950 |
| 100 | 0.909 |
| 150 | 0.860 |
| 200 | 0.816 |
| 250 | 0.773 |
| 300 | 0.726 |
| 350 | 0.695 |
| 400 | 0.670 |

The embodiments of the invention in which an exclusive property or privilege is claimed are defined as follows:

1. A method of producing a high surface area silver comprising the steps of admixing a water soluble silver salt, a water soluble organic carboxylate, and water; collecting the precipitate of silver carboxylate; drying said silver carboxylate in a thin layer until flaked; contacting the silver carboxylate with a surface heated to a temperature from about 35° C. greater than the decomposition temperature of the silver carboxylate to about 375° C.; and collecting the reduced silver.

2. A method of producing a high surface area silver comprising the steps of admixing a water soluble silver salt, a water soluble carboxylate selected from the group consisting of the formates and oxalates, and water; collecting the precipitate of silver carboxylate; spreading said silver carboxylate in a thin layer; drying said silver carboxylate until flaked; breaking said flakes; sizing said flakes to a narrow particle size fraction having a 25 Tyler mesh differential; contacting the sized silver carboxylate particles with a surface heated to a temperature at least 35° C. greater than the decomposition temperature of the silver carboxylate and less than 375° C.; explosively decomposing the silver carboxylate to silver; and collecting the silver.

3. A method of producing a high surface area silver comprising the steps of admixing a water soluble silver salt, a water soluble carboxylate selected from the group consisting of the formates and oxalates and water; collecting the precipitate of silver carboxylate; spreading said silver carboxylate in a thin layer; drying said silver carboxylate until flaked; breaking said flakes; sizing said flakes to a particle size between 10–35 Tyler mesh; contacting the sized silver carboxylate particles with a surface heated to a temperature at least 35° C. greater than the decomposition temperature of the silver carboxylate and less than 375° C.; explosively decomposing the silver carboxylate to silver; and collecting the silver.

4. A method of producing a high surface area silver comprising the steps of admixing a water soluble silver salt, a water soluble carboxylate selected from the group consisting of the formates and oxalates and water; collecting the precipitate of silver carboxylate; spreading said silver carboxylate in a thin layer; drying said silver carboxylate by infra-red radiation until flaked; breaking said flakes; sizing said flakes to a particle size between 10–35 Tyler mesh; contacting the sized silver carboxylate particles with a surface heated to a temperature at least 35° C. greater than the decomposition temperature of the silver carboxylate and less than 375° C.; explosively decomposing the silver carboxylate to silver; and collecting the silver.

5. A method of producing a high surface area silver comprising the steps of admixing silver nitrate, a water soluble oxalate and water; collecting the precipitate of silver oxalate; spreading the silver oxalate into a thin layer upon a metallic surface; subjecting said layer of silver oxalate to infra-red radiation and drying said silver oxalate until flaked into a hard brittle conglomerate; sizing said silver oxalate conglomerate to a particle size between 10 and 35 Tyler mesh; contacting said sized silver oxalate particles with a surface heated to a temperature of from about 175° C. to 375° C.; explosively decomposing the silver oxalate to metallic silver and carbon dioxide; and collecting the reduced silver.

References Cited

UNITED STATES PATENTS 2,404,438   7/1946   Evans _____ 252–476

HYLAND BIZOT, *Primary Examiner.*

RICHARD O. DEAN, *Examiner.*